United States Patent
Jin et al.

(10) Patent No.: US 12,298,886 B2
(45) Date of Patent: May 13, 2025

(54) APPLICATION PROGRAM MONITORING METHOD AND APPARATUS, AND READABLE STORAGE MEDIUM

(71) Applicant: Siemens Ltd., China, Beijing (CN)

(72) Inventors: Xin Jin, Beijing (CN); Liang Liao, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 0 days.

(21) Appl. No.: 18/694,703

(22) PCT Filed: Sep. 26, 2021

(86) PCT No.: PCT/CN2021/120802
§ 371 (c)(1),
(2) Date: Mar. 22, 2024

(87) PCT Pub. No.: WO2023/044879
PCT Pub. Date: Mar. 30, 2023

(65) Prior Publication Data
US 2024/0338293 A1    Oct. 10, 2024

(51) Int. Cl.
G06F 11/3604    (2025.01)
(52) U.S. Cl.
CPC .............................. *G06F 11/3612* (2013.01)
(58) Field of Classification Search
None
See application file for complete search history.

(56) References Cited

U.S. PATENT DOCUMENTS

| | | | |
|---|---|---|---|
| 6,493,868 B1 * | 12/2002 | DaSilva | H04L 1/20 |
| | | | 345/1.3 |
| 2005/0066314 A1 * | 3/2005 | Bates | G06F 11/3644 |
| | | | 717/129 |

(Continued)

FOREIGN PATENT DOCUMENTS

| | | | |
|---|---|---|---|
| CN | 103 514 072 | 1/2014 | .............. G06F 11/26 |
| CN | 103 729 288 | 4/2014 | .............. G06F 11/36 |

(Continued)

OTHER PUBLICATIONS

E. Kereku and M. Gerndt, "The monitoring request interface (MRI)," Proceedings 20th IEEE International Parallel & Distributed Processing Symposium, Rhodes, Greece, 2006. (Year: 2006).*

(Continued)

*Primary Examiner* — Andrew M. Lyons
(74) *Attorney, Agent, or Firm* — Slayden Grubert Beard PLLC

(57) ABSTRACT

An example includes: receiving a call request containing a first functional block, searching a library for the block and displaying it; receiving a breakpoint setting request for a first event port, searching the library for codes of the block, analyzing the codes for the port, and adding a breakpoint flag at the port; receiving a monitoring parameter setting request, adding the name of the parameter, the port, and the first functional block to a monitoring parameter table; receiving a application program running request, searching the library for codes of each functional block, and running the codes according to the execution sequence relationship between blocks; and querying a monitoring parameter when the first block is run, then, if the monitoring parameter is found, acquiring the value of the parameter, and when a breakpoint flag is detected, pausing the running and displaying the current value on the interface.

8 Claims, 12 Drawing Sheets

(56) References Cited

U.S. PATENT DOCUMENTS

| | | | | |
|---|---|---|---|---|
| 2007/0283330 A1* | 12/2007 | Bates | ............... | G06F 11/3664 |
| | | | | 717/129 |
| 2012/0110555 A1* | 5/2012 | Bates | ............... | G06F 11/362 |
| | | | | 717/129 |
| 2013/0318504 A1* | 11/2013 | Eker | ............... | G06F 8/10 |
| | | | | 717/129 |
| 2014/0189650 A1* | 7/2014 | Gounares | ............... | G06F 11/3636 |
| | | | | 717/125 |

FOREIGN PATENT DOCUMENTS

| | | | | |
|---|---|---|---|---|
| CN | 104 375 938 | 2/2015 | ............ | G06F 11/36 |
| KR | 2010 0073180 | 7/2010 | ............ | G06F 11/36 |

OTHER PUBLICATIONS

F. Beck, F. Hollerich, S. Diehl and D. Weiskopf, "Visual monitoring of numeric variables embedded in source code," 2013 First IEEE Working Conference on Software Visualization (VISSOFT), Eindhoven, Netherlands, 2013, pp. 1-4. (Year: 2013).*

R. Faust et al., "Anteater: Interactive Visualization for Program Understanding," Jul. 5, 2019, arXiv:1907.02872v1 [cs.HC]. (Year: 2019).*

Search Report for International Application No. PCT/CN2021/120802, 13 pages.

* cited by examiner

```
26        public translate: TranslateService,
27        public userLoginService: userLoginService,
28        public userRegisterService: userRegisterService,
29        public toastr: ToastsManager,
30        public vcr: ViesContainerRef
31   ) {
32        this.toastr.setRootViewContainerRef(vcr);
33        console.log("There is nothing...");
34   }
35
36   ngOnInit() {
37        this.globalClickCallbackFn=this.renderer.listen(this.elementRef.nativeElement
38             console.log ("Global monitoring click event>"+event);
39   });
40
```

Problem  Output  Debugging console  Terminal

Fig. 1

APPLICATION PROGRAM MONITORING METHOD AND APPARATUS, AND READABLE STORAGE MEDIUM

CROSS-REFERENCE TO RELATED APPLICATIONS

This application is a U.S. National Stage Application of International Application No. PCT/CN2021/120802 filed Sep. 26, 2021, which designates the United States of America, the contents of which are hereby incorporated by reference in their entirety.

TECHNICAL FIELD

The present application relates to application programs. Various embodiments of the teachings herein include application program monitoring methods and/or apparatus.

BACKGROUND

Currently, because of a lack of experience in automatic programming, process engineers and equipment engineers usually maintain and upgrade various automated production lines including robotic production lines with the aid of program engineers of a system integrator (SI), and it is very difficult for them to complete the task by themselves. In addition, it is necessary to debug a computer program realizing automatic software or a computer program used for controlling electronic hardware before using the automatic software or electronic hardware. Errors or defects in the computer program are found and reduced through debugging so that the computer program can run as expected. Since the user needs to read and understand the programming language of the computer program, the debugging process is time-consuming.

For a user, the debugging process is often more difficult if a plurality of programming languages are used in the computer program, and in addition, a change in a programming language may introduce an error into another programming language. The use of the debugging process to monitor and improve the efficiency of the computer program often requires that an automation engineer should be familiar with the programming language and mark debugging parameters in the programming language, and thus the values of debugging parameters can be read in the debugging process to determine whether the computer program runs as expected. As shown in FIG. 1, the engineer made a mark at the head of line 37 of the codes to indicate that a debugging parameter exists in the line. When the number of production variables is very large, a user needs to find the code of each variable in the programming language. It is time-consuming and inefficient to do so. In addition, it is very difficult and also unnecessary for low-code programming software to identify the codes of variables.

SUMMARY

Teachings of the present disclosure include application program monitoring methods and apparatus. For example, a method may comprise: in response to a functional block call request entered by a user that contains a name of a first functional block, searching (S201, S301) a functional block library for the first functional block and displaying the first functional block on an interface, wherein the displayed content at least includes the name of the first functional block and a name of each event port which is included in the first functional block, and the first functional block is any functional block included in a first application program to be designed by the user; in response to a breakpoint setting request for a first event port of the first functional block entered by the user on the interface, searching (S202, S305) the functional block library for the codes of the first functional block, searching the codes for the first event port, and adding a breakpoint flag at the first event port, wherein the first event port is any event port of the first functional block; in response to a monitoring parameter setting request for a first data parameter input in or output from the first event port entered by the user on the interface, adding (S203, S306) the name of the first data parameter, the name of the first event port and the name of the first functional block as a monitoring parameter entry to a monitoring parameter table; in response to a first application program running request entered by the user, searching (S204, S307) the functional block library for the codes of each functional block according to the name displayed on the interface of each functional block included in the first application program, and running the codes of each functional block according to the found codes and the execution sequence relationship between functional blocks; and querying (S204, S307) a monitoring parameter of the first functional block in the monitoring parameter table when the first functional block is run, if the monitoring parameter is found, acquiring the value of the monitoring parameter during the running, and when a breakpoint flag is detected, pausing the running of the codes of the first functional block and displaying the current value of the monitoring parameter on the interface.

In some embodiments, the response to a breakpoint setting request for a first event port of the first functional block entered by the user on the interface comprises, if detecting that the user clicks (S303) on the breakpoint tool on the interface and that the user clicks (S305) on the first event port of the first functional block on the interface, determining that the user enters a breakpoint setting request for the first event port of the first functional block.

In some embodiments, the response to a monitoring parameter setting request for a first data parameter input in or output from the first event port entered by the user on the interface comprises, if detecting that the user enters (S304) a displaying request for the data parameter input in or output from the first event port of the first functional block, searching the functional block library for the codes of the first functional block, searching (S304) the codes for all data parameters input in or output from the first event port, and displaying all data parameters on the interface; and if detecting that the user selects (S306) a first data parameter input in or output from the first event port of the first functional block on the interface, determining that the user enters, on the interface, a monitoring parameter setting request for the first data parameter input in or output from the first event port of the first functional block.

In some embodiments, the response to a breakpoint setting request for a first event port of the first functional block entered by the user on the interface and the response to a monitoring parameter setting request for a first data parameter input in or output from the first event port entered by the user on the interface comprise: if detecting that the user clicks on the breakpoint tool on the interface, displaying a monitoring parameter search box on the interface; if detecting that the user enters the name of the first data parameter in the search box, searching the functional block library for the codes of each functional block according to the names of all functional blocks displayed on the interface, and searching the codes of the functional blocks for the first data parameter; displaying, on the interface, the name of each event port where the first data parameter is located and the name of the functional block where each event port is located; and if detecting that the user selects the name of the first event port where the first data parameter is located and the name of the first functional block where the first event port is located, determining that the user enters, on the interface, a breakpoint setting request for the first event port of the first functional block, and meanwhile determining that the user enters a monitoring parameter setting request for the first data parameter of the first event port of the first functional block.

In some embodiments, after pausing the running (S204, S307) of the codes of the first functional block, the method further comprises, in response to a continue-to-run request entered by the user on the interface, continuing to run subsequent codes.

In some embodiments, adding (S202, S305) a breakpoint flag at the first event port further comprises: setting the state of the first event port to Not Notified on the interface; pausing (S204, S307) the running of the codes of the first functional block further comprises: setting the state of the event port where the detected breakpoint flag is located to Being Notified on the interface; and when continuing to run the codes, setting the state of the event port where the detected breakpoint flag is located to Notified on the interface.

As another example, some embodiments include an application program monitoring apparatus (110), the apparatus (110) comprising: a functional block calling module (111), configured to, in response to a functional block call request entered by a user on an interface that contains the name of a first functional block, search a functional block library for the first functional block and display the first functional block, wherein the displayed content at least includes the name of the first functional block and the name of each event port which is included in the first functional block, and the first functional block is any functional block included in a first application program to be designed by the user; a breakpoint and monitoring parameter setting module (112), configured to, in response to a breakpoint setting request for a first event port of the first functional block entered by the user on the interface, search the functional block library for the codes of the first functional block, search the codes for the first event port, and add a breakpoint flag at the first event port, wherein the first event port is any event port of the first functional block; and, in response to a monitoring parameter setting request for a first data parameter input in or output from the first event port of the first functional block entered by the user on the interface, add the name of the first data parameter, the name of the first event port and the name of the first functional block as a monitoring parameter entry to a monitoring parameter table; and a running and monitoring module (113), configured to, in response to a first application program running request entered by the user, search the functional block library for the codes of each functional block according to the name displayed on the interface of each functional block included in the first application program, and run the codes of each functional block according to the found codes and the execution sequence relationship between functional blocks; and query a monitoring parameter of the first functional block in the monitoring parameter table when the first functional block is run, acquire the value of the monitoring parameter during the running if the monitoring parameter is found, and pause the running of the codes of the first functional block and display the current value of the monitoring parameter on the interface when a breakpoint flag is detected.

As another example, some embodiments include a non-transient computer-readable storage medium, instructions being stored in the non-transient computer-readable storage medium, characterized in that the instructions allow a processor to perform the steps of the application program monitoring method as described herein when executed by the processor.

As another example, some embodiments include an electronic device comprising a processor (121) and a memory (122), wherein a computer program which can run on the processor (121) is stored in the memory (122), and the processor (121) performs one or more of the application program monitoring methods descried herein when executing the computer program.

As another example, some embodiments include a computer program product, comprising a computer program or instructions, characterized in that, when the computer program or instructions are executed by a processor, one or more of the application program monitoring methods as described herein are performed.

BRIEF DESCRIPTION OF THE DRAWINGS

Example embodiments of the teachings of the present disclosure are described in detail by reference to the drawings so that those skilled in the art can have a clearer idea of the above-mentioned, and other, features and advantages of the present application. In the drawings:

FIG. 1 shows an example of marking debugging parameters in a computer program in the prior art;

DESCRIPTION OF REFERENCE NUMERALS IN THE DRAWINGS

Figure 2:
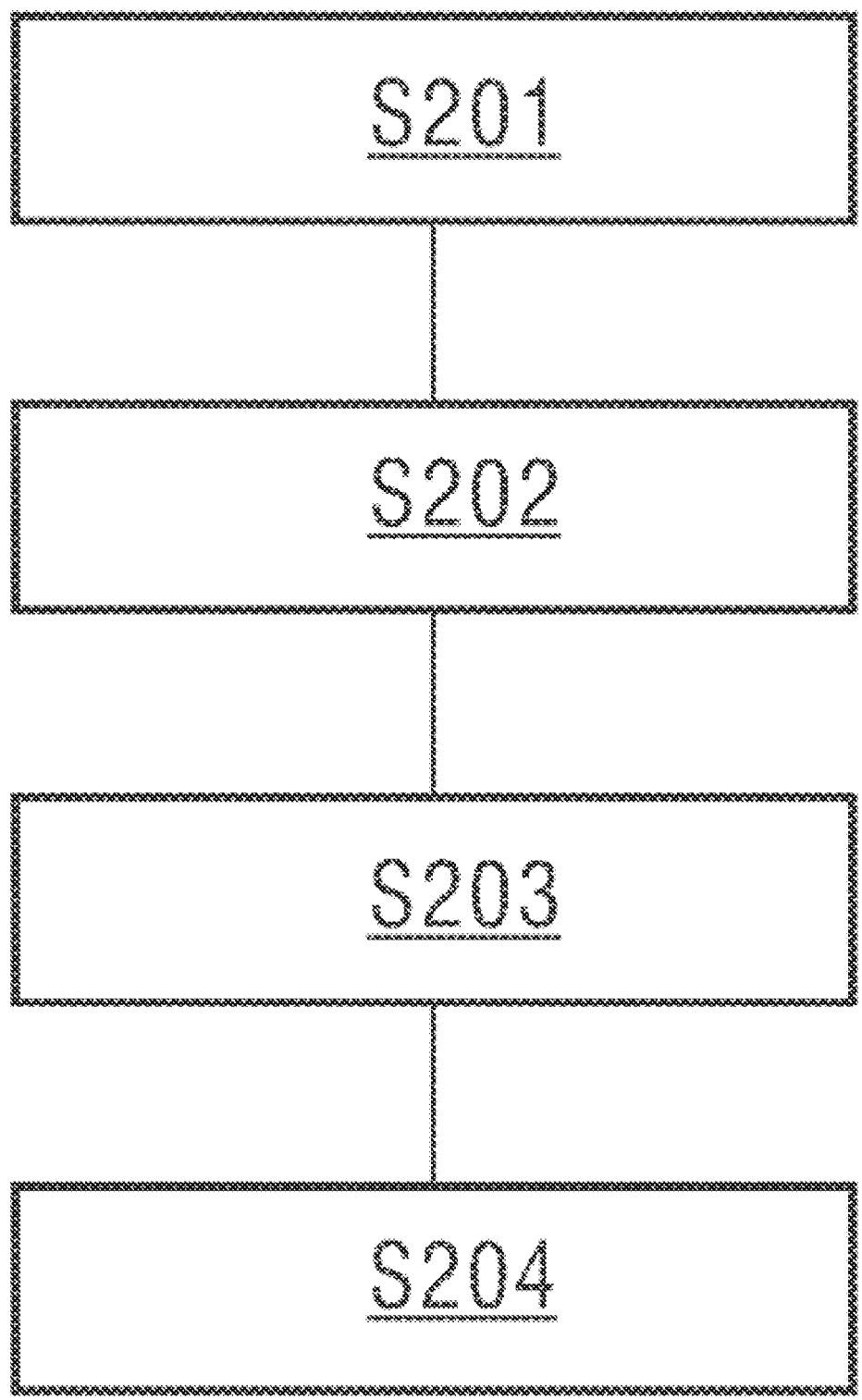
FIG. 2 is a flowchart of an example application program monitoring method incorporating teachings of the present application.

| Reference numeral | Meaning |
|---|---|
| S201-S204 | Steps |
| S301-S307 | Steps |
| 51 | Breakpoint tool |
| 81 | Running tool |
| 111 | Functional block calling module |
| 112 | Output/input relationship establishing module |
| 113 | Breakpoint and monitoring parameter setting module |
| 114 | Running and monitoring module |
| 121 | Processor |
| 122 | Memory |
| 123 | Power supply |
| 124 | Input/output unit |

DETAILED DESCRIPTION

Teachings of the present application describe application program monitoring methods and apparatus which may improve monitoring efficiency of the application program. For example, an application program monitoring method comprises: in response to a functional block call request entered by a user that contains the name of a first functional block, searching a functional block library for the first functional block and displaying the first functional block on an interface, wherein the displayed content at least includes the name of the first functional block and the name of each event port which is included in the first functional block, and the first functional block is any functional block included in a first application program to be designed by the user; in response to a breakpoint setting request for a first event port of the first functional block entered on the interface by the user, searching the functional block library for the codes of the first functional block, searching the codes for the first event port, and adding a breakpoint flag at the first event port, wherein the first event port is any event port of the first functional block; in response to a monitoring parameter setting request for a first data parameter input in or output from the first event port entered on the interface by the user, adding the name of the first data parameter, the name of the first event port and the name of the first functional block as a monitoring parameter entry to a monitoring parameter table; in response to a first application program running request entered by the user, searching the functional block library for the codes of each functional block according to the name displayed on the interface of each functional block included in the first application program, and running the codes of each functional block according to the found codes and the execution sequence relationship between functional blocks; and querying a monitoring parameter of the first functional block in the monitoring parameter table when the first functional block is run, if the monitoring parameter is found, acquiring the value of the monitoring parameter during the running, and when a breakpoint flag is detected, pausing the running of the codes of the first functional block and displaying the current value of the monitoring parameter on the interface.

In some embodiments, breakpoint setting and parameter monitoring in an application program are realized through a graphic tool. The graphic tool has high visualization and is easy to operate, without any necessity of viewing codes. Thus, breakpoint setting and parameter monitoring in an application program can be completed without extensive programming experience, and the monitoring/debugging efficiency is improved.

In some embodiments, the response to the breakpoint setting request for a first event port of the first functional block entered on the interface by the user comprises: if detecting that the user clicks on the breakpoint tool on the interface and that the user clicks on the first event port of the first functional block on the interface, determining that the user enters a breakpoint setting request for the first event port of the first functional block. Breakpoint setting in an application program is realized through a graphic tool.

In some embodiments, the response to a monitoring parameter setting request for a first data parameter input in or output from the first event port entered on the interface by the user comprises: if detecting that the user enters a display request for the data parameter input in or output from the first event port of the first functional block, searching the functional block library for the codes of the first functional block, searching the codes for all data parameters input in or output from the first event port, and displaying all data parameters on the interface (S304); if detecting that the user selects, on the interface, a first data parameter input in or output from the first event port of the first functional block, determining that the user enters, on the interface, a monitoring parameter setting request for the first data parameter input in or output from the first event port of the first functional block. Monitoring parameter setting in an application program is realized through a graphic tool.

In some embodiments, the response to a breakpoint setting request for a first event port of the first functional block entered on the interface by the user and the response to a monitoring parameter setting request for a first data parameter input in or output from the first event port of the first functional block entered on the interface by the user comprise: if detecting that the user clicks on the breakpoint tool on the interface, displaying a monitoring parameter search box on the interface; if detecting that the user enters the name of the first data parameter in the search box, searching the functional block library for the codes of each functional block according to the names of all functional blocks displayed on the interface, and searching the codes of the functional blocks for the first data parameter; displaying, on the interface, the name of each event port where the first data parameter is located and the name of the functional block where each event port is located; if detecting that the user selects the name of the first event port where the first data parameter is located and the name of the first functional block where the first event port is located, determining that the user enters, on the interface, a breakpoint setting request for the first event port of the first functional block, and meanwhile determining that the user enters a monitoring parameter setting request for the first data parameter of the first event port of the first functional block. Breakpoint setting and monitoring parameter setting in an application program are both realized through a graphic tool.

In some embodiments, after pausing the running of the codes of the first functional block, the method further comprises in response to a continue-to-run request entered by the user on the interface, continuing to run subsequent codes.

In some embodiments, adding a breakpoint flag at the first event port further comprises: setting the state of the first event port to Not Notified on the interface; pausing the running of the codes of the first functional block further comprises: setting the state of the event port where the detected breakpoint flag is located to Being Notified on the interface; and when continuing to run the codes, setting the state of the event port where the detected breakpoint flag is located to Notified on the interface.

In some embodiments, an application program monitoring apparatus comprises: a functional block calling module, configured to, in response to a functional block call request entered by a user that contains the name of a first functional block, search a functional block library for the first functional block and display the first functional block on an interface, wherein the displayed content at least includes the name of the first functional block and the name of each event port which is included in the first functional block, and the first functional block is any functional block included in a first application program to be designed by the user; a breakpoint and monitoring parameter setting module, configured to, in response to a breakpoint setting request for a first event port of the first functional block entered by the user on the interface, search the functional block library for the codes of the first functional block, search the codes for the first event port, and add a breakpoint flag at the first event port, wherein the first event port is any event port of the first functional block; and in response to a monitoring parameter setting request for a first data parameter input in or output from the first event port of the first functional block entered by the user on the interface, add the name of the first data parameter, the name of the first event port and the name of the first functional block as a monitoring parameter entry to a monitoring parameter table; and a running and monitoring module, configured to, in response to a first application program running request entered by the user, search the functional block library for the codes of each functional block according to the name displayed on the interface of each functional block included in the first application program, and run the codes of each functional block according to the found codes and the execution sequence relationship between functional blocks; and query a monitoring parameter of the first functional block in the monitoring parameter table when the first functional block is run, acquire the value of the monitoring parameter during the running if the monitoring parameter is found, and pause the running of the codes of the first functional block and display the current value of the monitoring parameter on the interface when a breakpoint flag is detected.

In some embodiments, a non-transient computer-readable storage medium stores instructions allowing a processor to perform any application program monitoring methods described herein when executed by the processor.

In some embodiments, an electronic device comprises a processor and a memory, wherein a computer program which can run on the processor is stored in the memory, and the processor performs any application program monitoring method described herein when executing the computer program.

In some embodiments, a computer program product comprises a computer program or instructions, wherein, when the computer program or instructions are executed by a processor, any application program monitoring method described herein is performed.

To make clearer the objectives, the details of the technical solutions, and potential advantages of the teachings of the present application, example embodiments are described below. FIG. 2 is a flowchart of an example application program monitoring method incorporating teachings of the present application. As shown therein:

Step S201: In response to a functional block call request entered by a user that contains the name of a first functional block, search a functional block library for the first functional block and display the first functional block on an interface, wherein the displayed content at least includes the name of the first functional block and the name of each event port which is included in the first functional block, and the first functional block is any functional block included in a first application program to be designed by the user.

In some embodiments, in response to an execution sequence relationship set by the user between a first functional block and a second functional block displayed on the interface, save the execution sequence relationship between the first functional block and the second functional block, wherein the first functional block and the second functional block are any two functional blocks included in a first application program.

Step S202: In response to a breakpoint setting request for a first event port of the first functional block entered by the user on the interface, search the functional block library for the codes of the first functional block, search the codes for the first event port, and add a breakpoint flag at the first event port, wherein the first event port is any event port of the first functional block.

Step S203: In response to a monitoring parameter setting request for a first data parameter input in or output from the first event port of the first functional block entered by the user on the interface, add the name of the first data parameter, the name of the first event port and the name of the first functional block as a monitoring parameter entry to a monitoring parameter table.

Step S204: In response to a first application program running request entered by the user, search the functional block library for the codes of each functional block according to the name displayed on the interface of each functional block included in the first application program, and run the codes of each functional block according to the found codes and the execution sequence relationship between functional blocks; and query a monitoring parameter of the first functional block in the monitoring parameter table when the first functional block is run, and if the monitoring parameter is found, acquire the value of the monitoring parameter during the running, and when a breakpoint flag is detected, pause the running of the codes of the first functional block and display the current value of the monitoring parameter on the interface.

In some embodiments, breakpoint setting and parameter monitoring in an application program are realized through a graphic tool. The graphic tool has high visualization and is easy to operate, without any necessity of viewing codes. Thus, breakpoint setting and parameter monitoring in an application program can be completed without extensive programming experience, and the monitoring/debugging efficiency is improved.

In some embodiments, in Step S202, in response to a breakpoint setting request for a first event port of the first functional block entered by the user on the interface, the method comprises if detecting that the user clicks on the breakpoint tool on the interface and that the user clicks on the first event port of the first functional block on the interface, determining that the user enters a breakpoint setting request for the first event port of the first functional block.

In some embodiments, breakpoint setting in an application program is realized through a graphic tool.

In some embodiments, in Step S203, in response to a monitoring parameter setting request for a first data parameter input in or output from the first event port of the first functional block entered by the user on the interface, the method comprises: if detecting that the user enters a displaying request for the data parameter input in or output from the first event port of the first functional block, searching the functional block library for the codes of the first functional block, searching the codes for all data parameters input in or output from the first event port, and displaying all data parameters on the interface; if detecting that the user selects a first data parameter input in or output from the first event port of the first functional block on the interface, determining that the user enters a monitoring parameter setting request for the first data parameter input in or output from the first event port of the first functional block on the interface.

In some embodiments, monitoring parameter setting in an application program is realized through a graphic tool.

In some embodiments, in response to a breakpoint setting request for a first event port of the first functional block entered by the user on the interface in Step S202, and in response to a monitoring parameter setting request for a first data parameter input in or output from the first event port of the first functional block entered by the user on the interface in Step 203, the method comprises: if detecting that the user clicks on the breakpoint tool on the interface, displaying a monitoring parameter search box on the interface; if detecting that the user enters the name of the first data parameter in the search box, searching the functional block library for the codes of each functional block according to the names of all functional blocks displayed on the interface, and searching the codes of the functional blocks for the first data parameter; displaying the name of each event port where the first data parameter is located and the name of the functional block where each event port is located on the interface; and if detecting that the user selects the name of the first event port where the first data parameter is located and the name of the first functional block where the first event port is located, determining that the user enters, on the interface, a breakpoint setting request for the first event port of the first functional block, and meanwhile determining that the user enters a monitoring parameter setting request for the first data parameter of the first event port of the first functional block.

In some embodiments, breakpoint setting and monitoring parameter setting in an application program are both realized through a graphic tool.

In some embodiments, in Step S204, after pausing the running of the codes of the first functional block, the method further comprises: continuing to run subsequent codes in response to a continue-to-run request entered by the user on the interface.

In some embodiments, in Step S202, adding a breakpoint flag at the first event port further comprises setting the state of the first event port to Not Notified on the interface.

In Step S204, pausing the running of the codes of the first functional block further comprises: setting the state of the event port where the detected breakpoint flag is located to Being Notified on the interface; and when continuing to run the codes, setting the state of the event port where the detected breakpoint flag is located to Notified on the interface.

Figure 3:
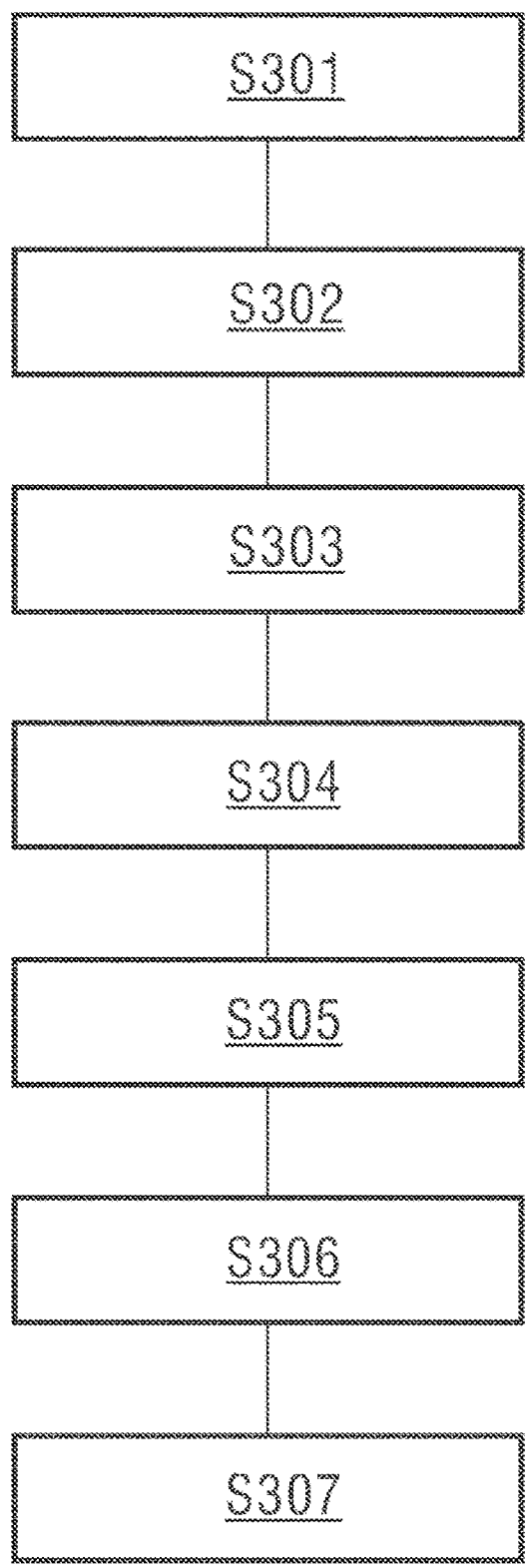
FIG. 3 is a flowchart of an example application program monitoring method incorporating teachings of the present application.

FIG. 3 is a flowchart of an example application program monitoring method incorporating teachings of the present application, the method comprising:

Step S301: The application program editor receives a functional block call request entered by a user that contains the name of a first functional block, searches a functional block library (FB library, functional block library) for the first functional block and displays the first functional block on an interface, wherein the displayed content at least includes the name of the first functional block and the name of each event port which is included in the first functional block, and the first functional block is any functional block included in a first application program to be designed by the user.

Figure 4:
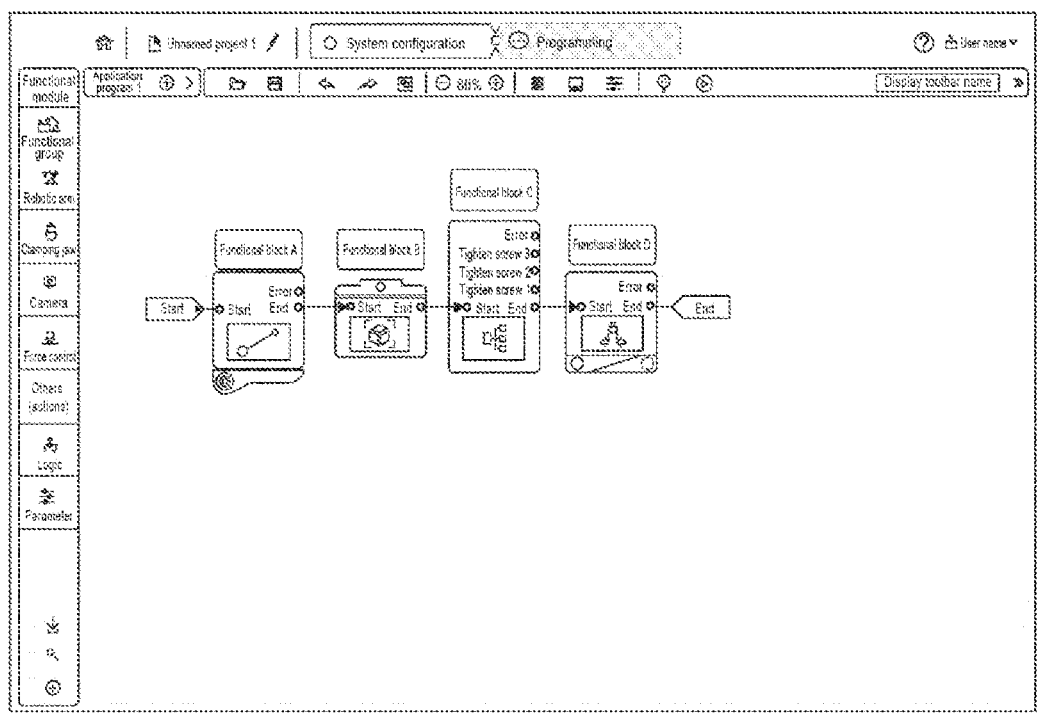
FIG. 4 shows an example 1 of the interface of an application program editor incorporating teachings of the present application.

FIG. 4 shows example 1 of the interface of an application program editor, and, as shown in FIG. 4, source codes of various functional blocks for realizing various functions are saved in the functional block library. The user may call a functional block in the functional block library to design an application realizing desired functions. For example, in FIG. 4, if the user needs to design an application program, and the application program needs to be realized with the cooperation of four functional blocks A, B, C and D, then the user calls the functional blocks A, B, C and D from the functional block library.

The event ports in the figure are, for example, start event port, error event port, tighten screw event port, and end event port.

Step S302: When detecting that an execution sequence relationship has been set by the user between a first functional block and a second functional block displayed on the interface, the application program editor saves the execution sequence relationship between the first functional block and the second functional block, wherein the first functional block and the second functional block are any two functional blocks included in the first application program.

As shown in FIG. 4, supposing that the first functional block is functional block A, the second functional block is functional block B, and an execution sequence relationship of executing B after executing A exists between the functional block A and functional block B, then the user will draw an arrow pointing from an end event port of functional block A to a start event port of functional block B on the interface, and the application program editor will save the execution sequence relationship A→B between the functional block A and functional block B after detecting the arrow.

As shown in FIG. 4, an execution sequence relationship B→C and C→D also exists between the functional block B and functional block C and between the functional block C and functional block D.

Step S303: When detecting that the user clicks on the breakpoint tool on the toolbar on the interface, the application program editor highlights all event ports of all the functional blocks displayed on the interface.

Figure 5:
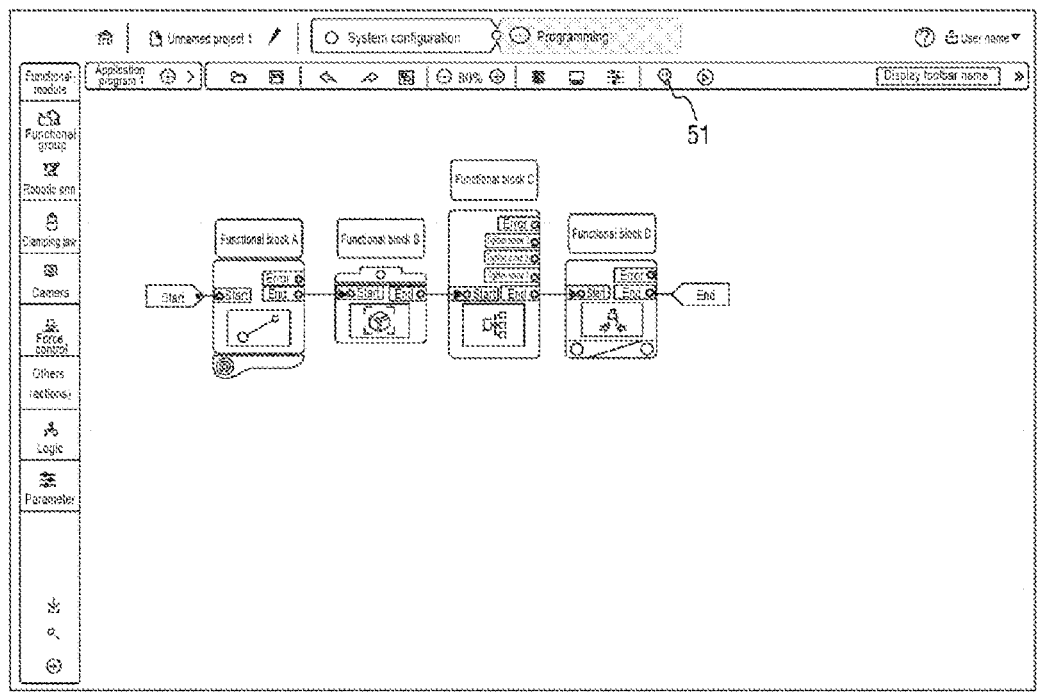
FIG. 5 shows example 2 of an example interface of an application program editor incorporating teachings of the present application.

As shown in FIG. 5, when the breakpoint tool 51 is clicked, the start event port, error event port, tighten screws 1-3 event port, and end event port of the functional blocks A, B, C and D are all highlighted.

Step S304: When detecting that the user enters a display request for the data parameter list input in or output from the first event port of the first functional block, the application program editor searches the functional block library for the names of all data parameters input in or output from the first event port of the first functional block, and displays the names of all data parameters input in or output from the first event port of the first functional block on the interface in the form of a list.

Figure 6:
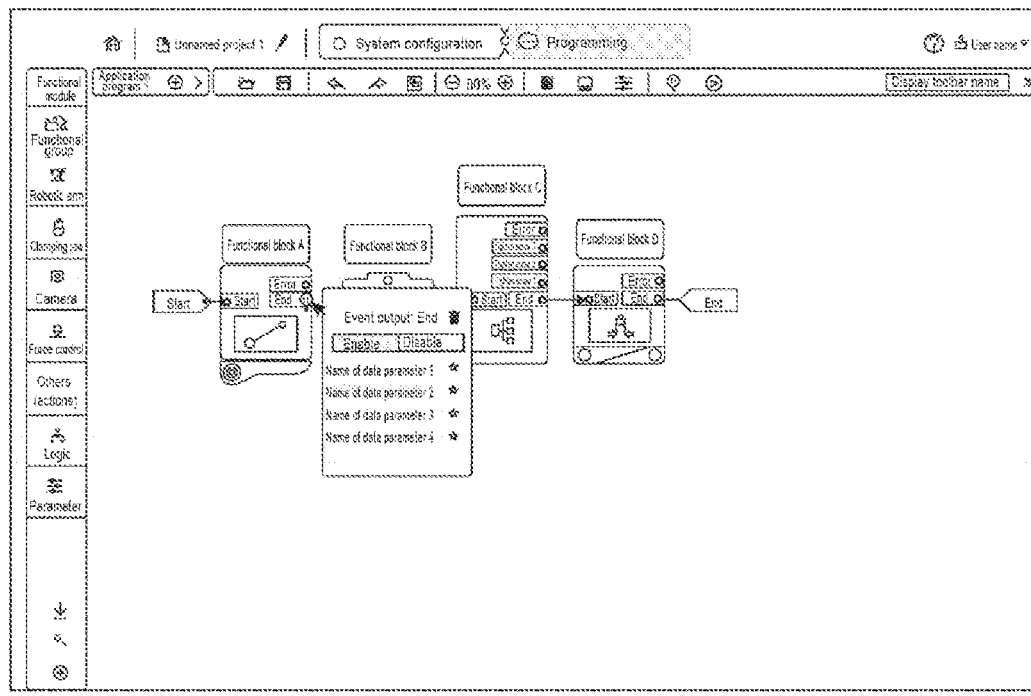
FIG. 6 shows example 3 of an example interface of an application program editor incorporating teachings of the present application.

As shown in FIG. 6, when detecting that the mouse hovers over an event port of a functional block, for example, end event port of functional block A, the application program editor searches the functional block library for the names of all data parameters input in or output from the end event port of functional block A, and then display the names of all found data parameters input in or output from the end event port, for example, the names of data parameters 1-4 in FIG. 6, on the right side of the end event port in the form of a list.

Step S305: When detecting that the user clicks on the first event port of the first functional block, the application program editor searches the functional block library for the codes of the first functional block, searches the codes for the first event port, and adds a breakpoint flag at the first event port.

For example, if the first event port is a start event port, the application program editors adds a breakpoint flag in the starting position of the codes of the first functional block; if the first event port is an end event port, the application program editor adds a breakpoint flag in the ending position of the codes of the first functional block; if the first event port is an error event port, the application program editor adds a breakpoint flag in the position of the codes where an error event occurs; if the first event port is a tighten screws 1-3 event port, the application program editor adds a breakpoint flag in the position of the codes where a tighten screws 1-3 event occurs.

For example, when detecting that the user clicks on event port a of functional block A, the application program editor determines that the user selects the event port a of functional block A.

As shown in FIG. 6, when the end event port of functional block A is clicked, the application program editor searches the functional block library for the codes of functional block A, searches the codes for the end event port, and adds a breakpoint flag at the end event port.

Figure 7:
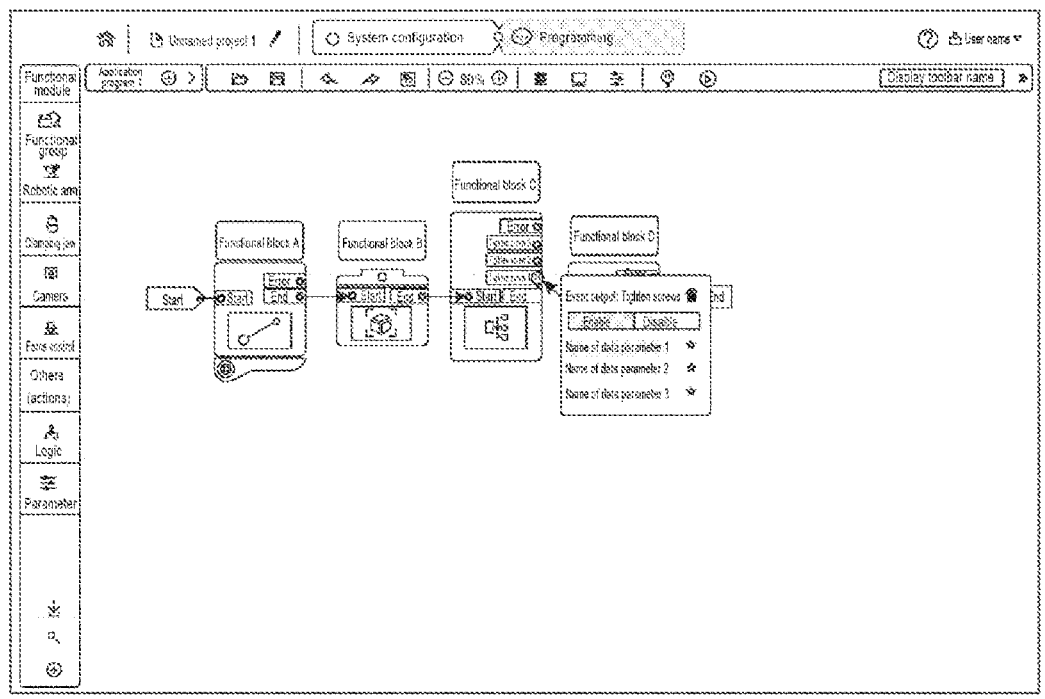
FIG. 7 shows example 4 of an example interface of an application program editor incorporating teachings of the present application.

One or more breakpoint flags may be added to the codes of any functional block in Step S305. FIG. 7 shows an example of the interface where a breakpoint flag is added at tighten screw 1 event port of the codes of functional block C.

Step S306: When detecting that the user selects the name of a first data parameter in the list of names of data parameters input in or output from the first event port of the first functional block displayed on the interface, the application program editor adds the name of the first data parameter, the name of the first event port, and the name of the first functional block as a monitoring parameter entry to the monitoring parameter table maintained by itself.

For example, in FIG. 6, the user selects the name of data parameter 2 of the end event port of functional block A, and in FIG. 7, the user selects the name of data parameter 1 of tighten screw 1 event port of functional block C.

Step S307: When receiving a running request for a first application program, the application program editor determines the running sequence between functional blocks according to the name displayed on the interface of each functional block included in the first application program and the saved execution sequence between functional blocks, searches the functional block library for the codes of the functional blocks in turn according to the running sequences of the functional block, and run the codes of the functional blocks in turn according to the codes of the functional blocks and the execution sequence relationship between the functional blocks; and when running a functional block, the application program editor first queries the monitoring parameter table maintained by itself, queries all monitoring data parameters of the functional block in the table, if finding monitoring parameters, the application program editor acquires the values of the monitoring parameters on a real-time basis during the running, and when detecting a breakpoint flag, the application program editor pauses the running of the codes of the functional block and displays the current values of the monitoring parameters on the interface.

Figure 8:
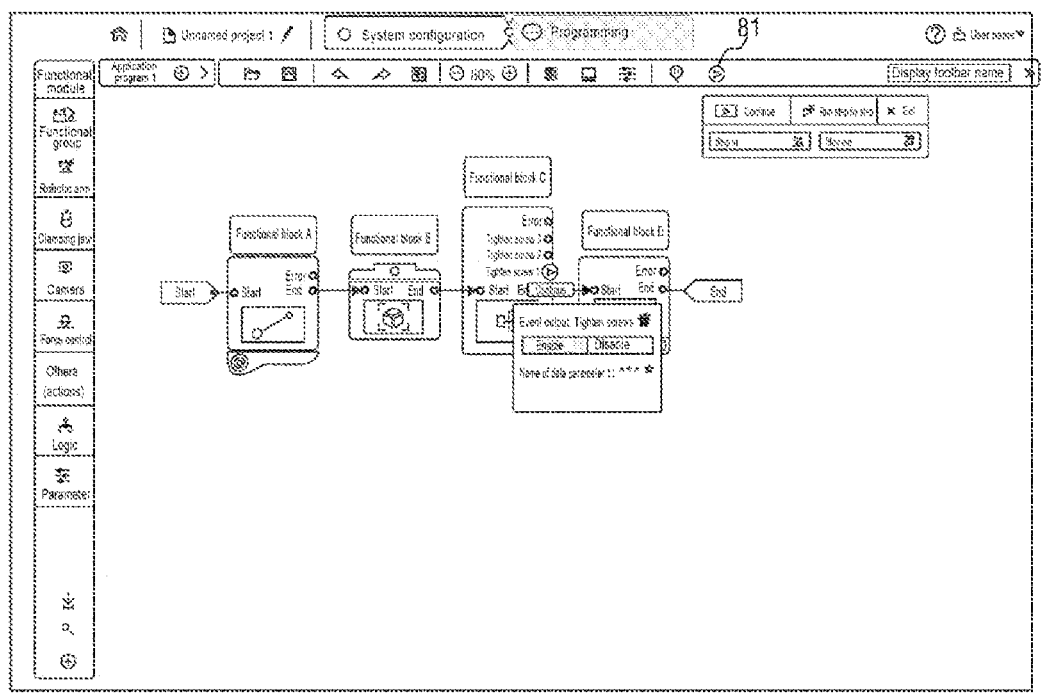
FIG. 8 shows example 5 of an example interface of an application program editor incorporating teachings of the present application.

As shown in FIG. 8, if the running tool 81 is clicked, the application program editor starts to run functional blocks A-D. When running to the tighten screw 1 event port of functional block C and detecting a breakpoint flag, the application program editor pauses the running and displays the current values of monitoring parameters on the interface.

When the application program editor pauses the running, a Continue button is displayed at the corresponding event port of the functional block on the interface. If detecting that the user clicks on the button, the application program editor continues to run. As shown in FIG. 8, a Continue button is displayed below the tighten screw 1 event port of functional block C.

In addition, when detecting that the user clicks on the breakpoint tool on the toolbar, the application program editor may further display a monitoring parameter search box on the interface. When detecting that the user enters the name of a data parameter in the search box, the application program editor searches the functional block library for the codes of the functional blocks according to the names of all functional blocks displayed on the interface and searches the codes of the functional blocks for the data parameter. If the data parameter is found, the application program editor combines the name of the data parameter with the name of each event port where the data parameter is located and the name of the functional block where each event port is located, and displays each combination as an entry in the drop box (that is, each entry contains the name of the data parameter, the name of the event port where the data parameter is located and the name of the functional block where the event port is located) of the search box;

then, when detecting that the user selects an entry in the drop box, the application program editor determines that the user enters a breakpoint setting request for the event port in the entry and enters a monitoring parameter setting request for the data parameter in the entry, and thus the application program editor searches the functional block library for the codes of the functional block according to the name of the functional block and the name of the event port in the entry, searches the codes for the event port, and adds a breakpoint flag at the event port; meanwhile, the application program editor adds the name of the data parameter, the name of the event port and the name of the functional block in the entry as a monitoring parameter entry to the monitoring parameter table maintained by itself.

Figure 9:
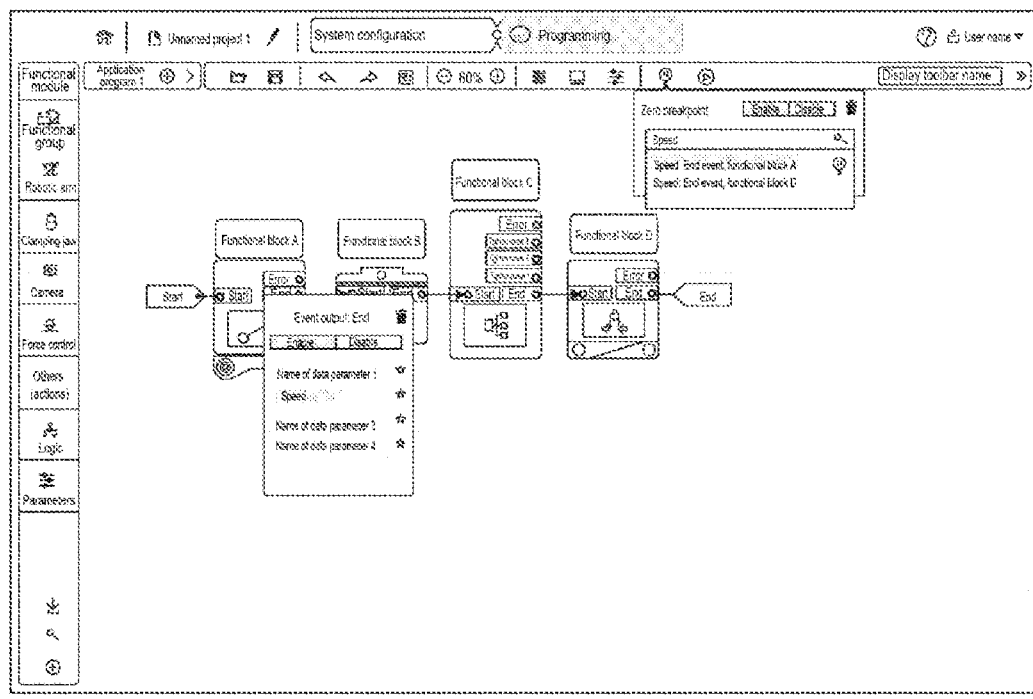
FIG. 9 shows example 6 of an example interface of an application program editor incorporating teachings of the present application.

As shown in FIG. 9, when detecting that the user enters a speed in the search box, the application program editor searches the codes of functional block A-D for the speed data parameter. If the search result shows that the output data parameter of the end event port of functional block A contains a speed data parameter, the output data parameter of the end event port of functional block D also contains a speed data parameter, the application program editor displays two search result entries in the drop box of the search box: speed: end event, functional block A; speed: end event, functional block D. In addition, since the mouse hovers over the entry: speed: end event, functional block A, the application program editor displays all data parameters output from the end event port below the end event port of functional block A, wherein the speed is highlighted. When detecting that the user clicks on the entry: speed: end event, functional block A in the drop box of the search box, the application program editor sets a breakpoint flag at the end event port of the codes of functional block A, and meanwhile adds the speed data parameter, the end event port and functional block A as a monitoring parameter entry to the monitoring parameter table.

Figure 10:
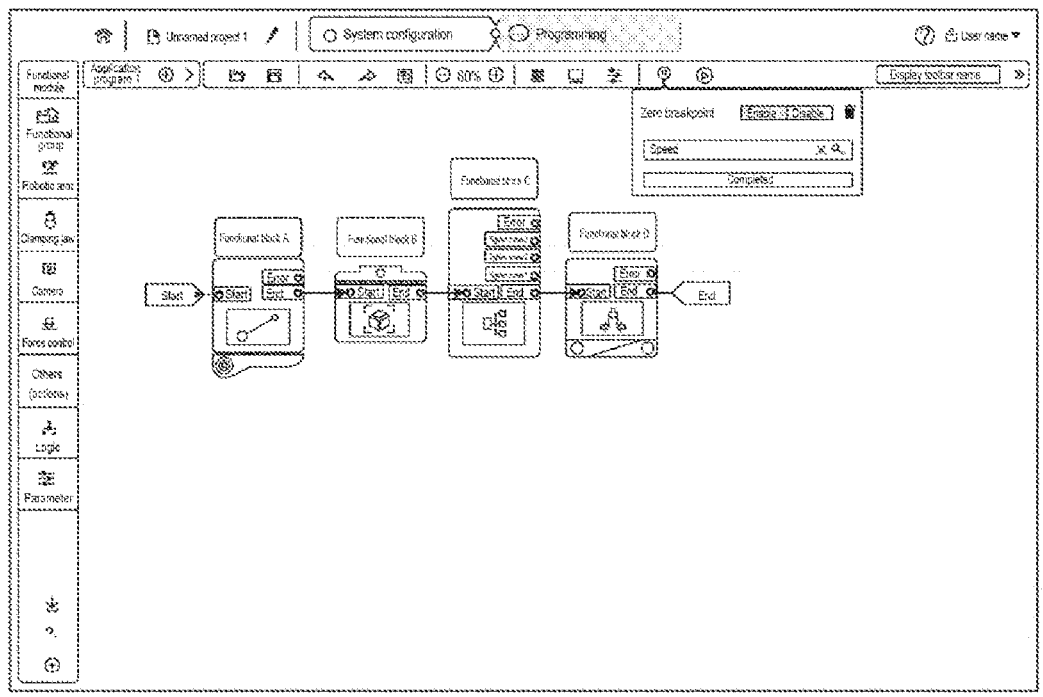
FIG. 10 shows example 7 of an example interface of an application program editor incorporating teachings of the present application.

FIG. 10 shows an example of the interface of the application program editor after the breakpoint setting and the monitoring parameter setting are completed in FIG. 9.

In addition, for an event port with a breakpoint flag, three states may be set: Not Notified, Being Notified, and Notified. The default state of an event port with a breakpoint flag is Not Notified, indicating the values of the monitoring parameters of this port have not been displayed to the user; when the codes pause the running at an event port, the state of the event port is changed from Not Notified to Being Notified on the interface, indicating that the values of the monitoring parameters are being displayed to the user; when the pause state ends and the codes continue to run, the state of the event port is changed to Notified, indicating that the user has been notified of the values of the monitoring parameters of the event port.

Figure 11:
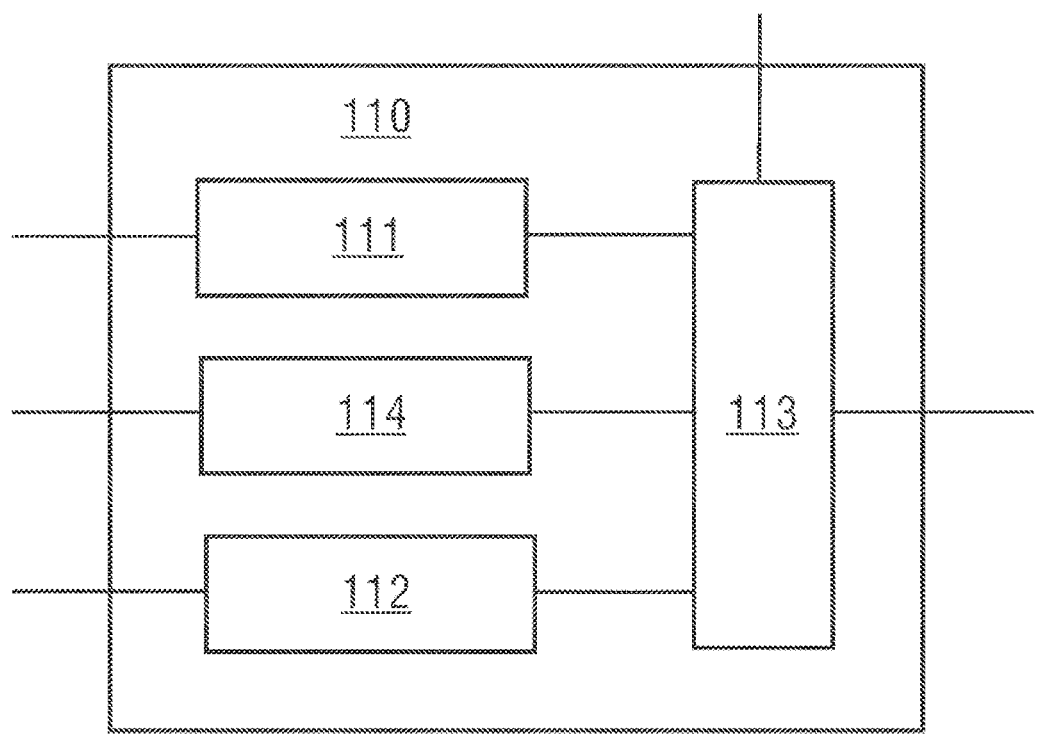
FIG. 11 shows an example structure of an application program monitoring apparatus incorporating teachings of the present application.

FIG. 11 shows the structure of an application program monitoring apparatus 110 provided in an embodiment of the present application, and the apparatus 110 mainly comprises:

- a functional block calling module 111, configured to, in response to a functional block call request entered by a user that contains the name of a first functional block, search a functional block library for the first functional block and display the first functional block on an interface, wherein the displayed content at least includes the name of the first functional block and the name of each event port which is included in the first functional block, and the first functional block is any functional block included in a first application program to be designed by the user;
- a breakpoint and monitoring parameter setting module 112, configured to, in response to a breakpoint setting request for a first event port of the first functional block entered by the user on the interface, search the functional block library for the codes of the first functional block, search the codes for the first event port, and add a breakpoint flag at the first event port, wherein the first event port is any event port of the first functional block; and, in response to a monitoring parameter setting request for a first data parameter input in or output from the first event port of the first functional block entered by the user on the interface, add the name of the first data parameter, the name of the first event port and the name of the first functional block as a monitoring parameter entry to a monitoring parameter table;
- a running and monitoring module 113 configured to, in response to a first application program running request entered by the user, search the functional block library for the codes of each functional block according to the name displayed on the interface of each functional block included in the first application program, and run the codes of each functional block according to the found codes and the execution sequence relationship between functional blocks; and query a monitoring parameter of the first functional block in the monitoring parameter table when the first functional block is run, acquire the value of the monitoring parameter during the running if the monitoring parameter is found, and pause the running of the codes of the first functional block and display the current value of the monitoring parameter on the interface when a breakpoint flag is detected.

In some embodiments, the application program monitoring apparatus further comprises: an output/input relationship establishing module 114, configured to save the execution sequence relationship between the first functional block and the second functional block in response to an execution sequence relationship set by the user between a first functional block and a second functional block displayed on the interface, wherein the first functional block and the second functional block are any two functional blocks included in the first application program.

In some embodiments, the response of the breakpoint and monitoring parameter setting module 112 to a breakpoint setting request entered by the user for a first event port of the first functional block on the interface comprises if detecting that the user clicks on the breakpoint tool on the interface and that the user clicks on the first event port of the first functional block on the interface, determining that the user enters a breakpoint setting request for the first event port of the first functional block.

In some embodiments, breakpoint setting in an application program is realized through a graphic tool.

In some embodiments, the response of the breakpoint and monitoring parameters setting module 112 to a monitoring parameter setting request entered by the user for a first data parameter input in or output from the first event port of the first functional block on the interface comprises: if detecting that the user enters a display request for the data parameter input in or output from the first event port of the first functional block, searching the functional block library for the codes of the first functional block, searching the codes for all data parameters input in or output from the first event port, and displaying all data parameters on the interface; and if detecting that the user selects a first data parameter input in or output from the first event port of the first functional block on the interface, determining that the user enters a monitoring parameter setting request for the first data parameter input in or output from the first event port of the first functional block on the interface.

In some embodiments, monitoring parameter setting in an application program is realized through a graphic tool.

In some embodiments, the response of the breakpoint and monitoring parameter setting module 112 to a breakpoint setting request entered by the user for a first event port of the first functional block on the interface and the response of this module to a monitoring parameter setting request entered by the user for a first data parameter input in or output from the first event port of the first functional block on the interface comprise: if detecting that the user clicks on the breakpoint tool on the interface, displaying a monitoring parameter search box on the interface; if detecting that the user enters the name of the first data parameter in the search box, searching the functional block library for the codes of each functional block according to the names of all functional blocks displayed on the interface, and searching the codes of the functional blocks for the first data parameter; displaying the name of each event port where the first data parameter is located and the name of the functional block where each event port is located on the interface; and if detecting that the user selects the name of the first event port where the first data parameter is located and the name of the first functional block where the first event port is located, determining that the user enters a breakpoint setting request for the first event port of the first functional block on the interface, and meanwhile determining that the user enters a monitoring parameter setting request for the first data parameter of the first event port of the first functional block.

In some embodiments, breakpoint setting and monitoring parameter setting in an application program are both realized through a graphic tool.

In some embodiments, after the running and monitoring module 113 pauses the running of the codes of the first functional block, the method further comprises: continuing to run subsequent codes in response to a continue-to-run request entered by the user on the interface.

In some embodiments, the breakpoint and monitoring parameter setting module 112 adding a breakpoint flag at the first event port further comprises: setting the state of the first event port to Not Notified on the interface; the running and monitoring module 113 pausing the running of the codes of the first functional block further comprises: setting the state of the event port where the detected breakpoint flag is located to Being Notified on the interface; and setting the state of the event port where the detected breakpoint flag is located to Notified on the interface when the running and monitoring module 113 continues to run the codes.

Some embodiments of the teachings of the present application further include a computer-readable storage medium, instructions are stored in the computer-readable storage medium, and the instructions allow a processor to perform one or more of the above-mentioned application program monitoring methods when executed by the processor. In some embodiments, the computer-readable storage medium may be included in the device/apparatus/system in the above-mentioned embodiments, or it may exist independently and be not assembled into the device/apparatus/ system. Instructions are stored in the computer-readable storage medium, and when a processor executes the stored instructions, the processor may perform the steps of the above-mentioned application program monitoring method.

In some embodiments, the computer-readable storage medium may be a non-volatile computer-readable storage medium, for example, including, but not limited to, a portable computer disk, a hard disk, a random access memory (RAM), a read-only memory (ROM), an erasable programmable read-only memory (EPROM or flash), a portable compact disk read-only memory (CD-ROM), an optical storage device, a magnetic storage device, or any proper combination thereof, but it is not used to restrict the scope of protection of the present application. In embodiments disclosed in the present application, the computer-readable storage medium may be any tangible medium which contains a program or in which a program is stored, and the program may be used by or used together with an instruction execution system, apparatus or device.

Some embodiments of the teachings of the present application include computer program products comprising a computer program or instructions, wherein, when the computer program or instructions are executed by a processor, one or more of the application program monitoring methods as described herein are performed.

Figure 12:
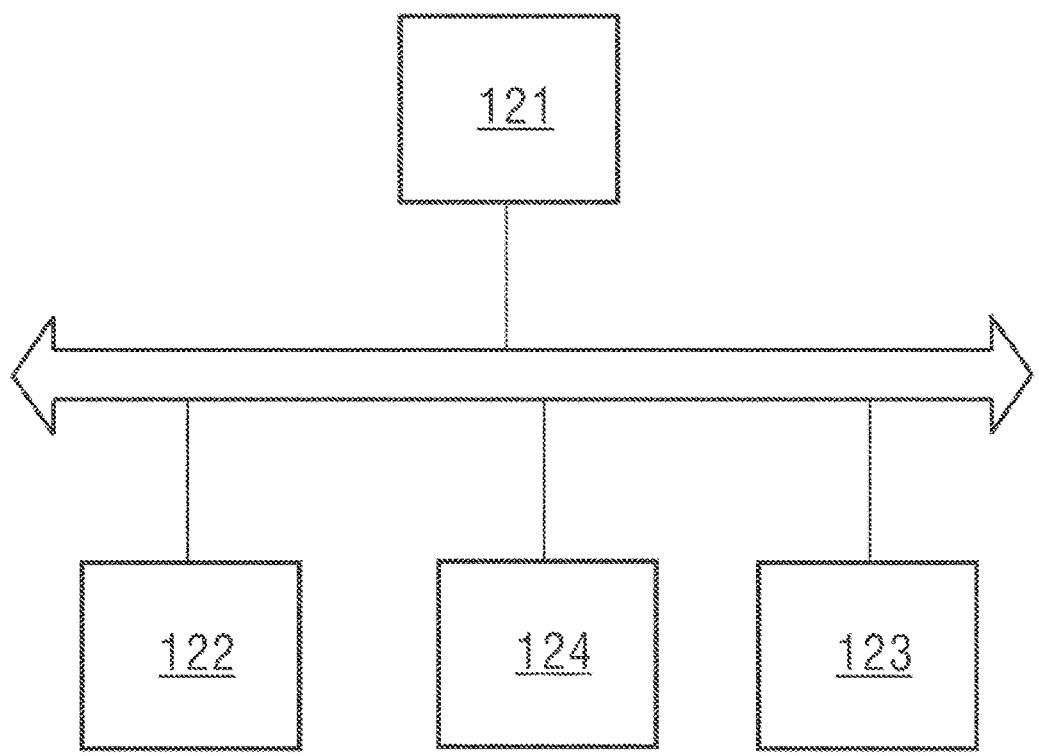
FIG. 12 shows an example structure of an electronic device incorporating teachings of the present application.

As shown in FIG. 12, some embodiments include an electronic device. FIG. 12 shows the structure of an example electronic device incorporating teachings of the present application. Specifically, the electronic device may comprise one or more processing cores: processors 121, one or more computer-readable storage media: memories 122, and computer programs which are stored in the memories and may run on the processors. When the program in the memory 122 is executed, one or more of the application program monitoring methods described herein may be realized.

In some embodiments, the electronic device may further comprise a power supply 123, an input/output unit 124 and other components in practical applications. Those skilled in the art may understand that the structure of the electronic device shown in FIG. 12 does not constitute a restriction on the electronic device, the electronic device may comprise more or fewer components than those shown, or some components may be combined, or different component layouts may be adopted.

The processor 121, the control center of the electronic device, is connected with different parts of the entire electronic device by use of various interfaces and lines and performs various functions of the server and process data by running or executing the software program and/or modules stored in the memory 122 and calling data stored in the memory 122, and thus the electronic device is wholly monitored.

The memory 122, namely the above-mentioned computer-readable storage medium, may be used to store software programs and modules. The processor 121 performs various function applications and data processing by running software programs and modules stored in the memory 122. The memory 122 may mainly comprise a program storing area and a data storing area, wherein an operating system and an application program required for at least one function may be stored in the program storing area, and data created based on the use of the server may be stored in the data storing area. In addition, the memory 122 may be a high-speed RAM or a non-volatile memory, for example, at least one magnetic disk storage medium, a flash device, or other volatile solid-state storage media. Accordingly, the memory 122 may further comprise a memory controller to provide the processor 121 with access to the memory 122.

The electronic device further comprises a power supply 123 supplying power to different components. The power supply may be logically connected with the processor 121 through a power supply management system, and thus recharging and discharging management and power consumption management are realized through the power supply management system. The power supply 123 may further comprise one or more DC or AC power supplies and any component of a recharging system, a power supply fault detection circuit, a power supply converter or inverter and a power supply state indicator.

The electronic device may further comprise an input/ output unit 124, and the input/output unit 124 may be used to receive input digital or text information and produce keyboard, mouse, joystick, optical or trackball signal input related to user settings and function control. The input/ output unit 124 may be further used to display information entered by the user or information provided for the user and various graphical user interfaces, and these graphical user interfaces may be formed by a graph, a text, an icon, a video and any combination thereof.

The flowcharts and block diagrams in the drawings of the present application show example system architectures, functions and operations which may be realized by the systems, methods, and computer program products incorporating teachings of the present application. In this regard, each block in the flowcharts or block diagrams may represent a module, a program segment, a part of codes, and the above-mentioned module, program segment or part of codes comprises one or more executable instructions for realizing stipulated logical functions. It should also be noted that in some alternative implementations, functions indicated in the blocks may also be generated in a sequence different from what is indicated in the drawings. For example, two connected blocks may actually be executed basically concurrently, and sometimes they may also be executed in an opposite sequence, depending on the functions involved. It should also be noted that each block in the block diagrams or flowcharts and a combination of blocks in the block diagrams or flowcharts may be realized by a special hardware-based system for performing stipulated functions or operations, or realized by a combination of special hardware and computer instructions.

Those skilled in the art may understand that the features stated in the embodiments and/or claims of the present disclosure may be combined and/or integrated, even if such a combination and/or integration is not explicitly stated in the present application. In particular, without departing from the spirit and teaching of the present application, the features stated in the embodiments and/or claims of the present application may be combined and/or integrated, and all these combinations and/or integrations fall within the scope of protection of the present application.

What is claimed is:

1. An application program monitoring method comprising:
   in response to a functional block call request entered by a user containing a name of a first functional block, searching a functional block library for the first functional block and displaying the first functional block on an interface, wherein the displayed content includes the name of the first functional block and a name of each event port included in the first functional block, and the first functional block includes any functional block included in a first application program to be designed by the user;
   in response to a breakpoint setting request for a first event port of the first functional block entered by the user on the interface, searching the functional block library for codes of the first functional block, analyzing the codes for the first event port, and adding a breakpoint flag at the first event port, wherein the first event port includes an event port of the first functional block;
   in response to a monitoring parameter setting request for a first data parameter communicated through the first event port entered by the user on the interface, adding the name of the first data parameter, the name of the first event port, and the name of the first functional block as a monitoring parameter entry to a monitoring parameter table;
   in response to a first application program running request entered by the user, searching the functional block library for codes of each functional block according to the name displayed on the interface of each functional block included in the first application program, and running the codes of each functional block according to the found codes and the execution sequence relationship between functional blocks; and
   querying a monitoring parameter of the first functional block in the monitoring parameter table when the first functional block is run, then, if the monitoring parameter is found, acquiring the value of the monitoring parameter during the running, and when a breakpoint flag is detected, pausing the running of the codes of the first functional block and displaying the current value of the monitoring parameter on the interface.

2. The method as claimed in claim 1, wherein the response to a breakpoint setting request for a first event port of the first functional block entered by the user on the interface comprises if the user clicks on the breakpoint tool and the first event port of the first functional block on the interface, interpreting a breakpoint setting request for the first event port of the first functional block.

3. The method as claimed in claim 2, wherein the response to a monitoring parameter setting request for a first data parameter comprises:
   if the user enters a displaying request for the data parameter, searching the functional block library for the codes of the first functional block, searching the codes for all data parameters, and displaying all data parameters on the interface;
   if the user selects a first data parameter input in or output from the first event port of the first functional block on the interface, interpreting a monitoring parameter setting request for the first data parameter of the first functional block.

4. The method as claimed in claim 1, wherein the response to a breakpoint setting request for a first event port of the first functional block entered by the user on the interface and the response to a monitoring parameter setting request for a first data parameter communicated through the first event port entered by the user on the interface comprise:
   if the user clicks on the breakpoint tool on the interface, displaying a monitoring parameter search box on the interface;
   if the user enters the name of the first data parameter in the search box, searching the functional block library for the codes of each functional block according to the names of all functional blocks displayed on the interface, and searching the codes of the functional blocks for the first data parameter;
   displaying, on the interface, the name of each event port where the first data parameter is located and the name of the functional block where each event port is located; and
   if the user selects the name of the first event port where the first data parameter is located and the name of the first functional block where the first event port is located, interpreting a breakpoint setting request for the first event port of the first functional block, and a monitoring parameter setting request for the first data parameter of the first event port of the first functional block.

5. The method as claimed in claim 1, wherein, after pausing the running of the codes of the first functional block, the method further comprises in response to a continue-to-run request entered by the user on the interface, continuing to run subsequent codes.

6. The method as claimed in claim 1, wherein:
   adding a breakpoint flag at the first event port further comprises setting the state of the first event port to Not Notified on the interface;
   pausing the running of the codes of the first functional block further comprises setting the state of the event port where the detected breakpoint flag is located to Being Notified on the interface, and when continuing to run the codes, setting the state of the event port where the detected breakpoint flag is located to Notified on the interface.

7. An application program monitoring apparatus comprising:
   a functional block calling module configured to, in response to a functional block call request entered by a user on an interface that contains the name of a first functional block, search a functional block library for the first functional block and display the first functional block, wherein the displayed content at least includes the name of the first functional block and the name of each event port which is included in the first functional block, and the first functional block is any functional block included in a first application program to be designed by the user;

a breakpoint and monitoring parameter setting module configured to, in response to a breakpoint setting request for a first event port of the first functional block entered by the user on the interface, search the functional block library for the codes of the first functional block, search the codes for the first event port, and add a breakpoint flag at the first event port, wherein the first event port is any event port of the first functional block; and, in response to a monitoring parameter setting request for a first data parameter communicated through the first event port of the first functional block entered by the user on the interface, add the name of the first data parameter, the name of the first event port and the name of the first functional block as a monitoring parameter entry to a monitoring parameter table; and a running and monitoring module configured to, in response to a first application program running request entered by the user, search the functional block library for the codes of each functional block according to the name displayed on the interface of each functional block included in the first application program, and run the codes of each functional block according to the found codes and the execution sequence relationship between functional blocks; and query a monitoring parameter of the first functional block in the monitoring parameter table when the first functional block is run, acquire the value of the monitoring parameter during the running if the monitoring parameter is found, and pause the running of the codes of the first functional block and display the current value of the monitoring parameter on the interface when a breakpoint flag is detected.

8. A non-transient computer-readable storage medium storing instructions causing one or more processors to:

in response to a functional block call request entered by a user containing a name of a first functional block, search a functional block library for the first functional block and displaying the first functional block on an interface, wherein the displayed content includes the name of the first functional block and a name of each event port included in the first functional block, and the first functional block includes any functional block included in a first application program to be designed by the user;

in response to a breakpoint setting request for a first event port of the first functional block entered by the user on the interface, search the functional block library for codes of the first functional block, analyze the codes for the first event port, and adding a breakpoint flag at the first event port, wherein the first event port includes an event port of the first functional block;

in response to a monitoring parameter setting request for a first data parameter communicated through the first event port entered by the user on the interface, add the name of the first data parameter, the name of the first event port, and the name of the first functional block as a monitoring parameter entry to a monitoring parameter table;

in response to a first application program running request entered by the user, search the functional block library for codes of each functional block according to the name displayed on the interface of each functional block included in the first application program, and running the codes of each functional block according to the found codes and the execution sequence relationship between functional blocks; and query a monitoring parameter of the first functional block in the monitoring parameter table when the first functional block is run, then, if the monitoring parameter is found, acquire the value of the monitoring parameter during the running, and when a breakpoint flag is detected, pause the running of the codes of the first functional block and displaying the current value of the monitoring parameter on the interface.

* * * * *